Figure 1:
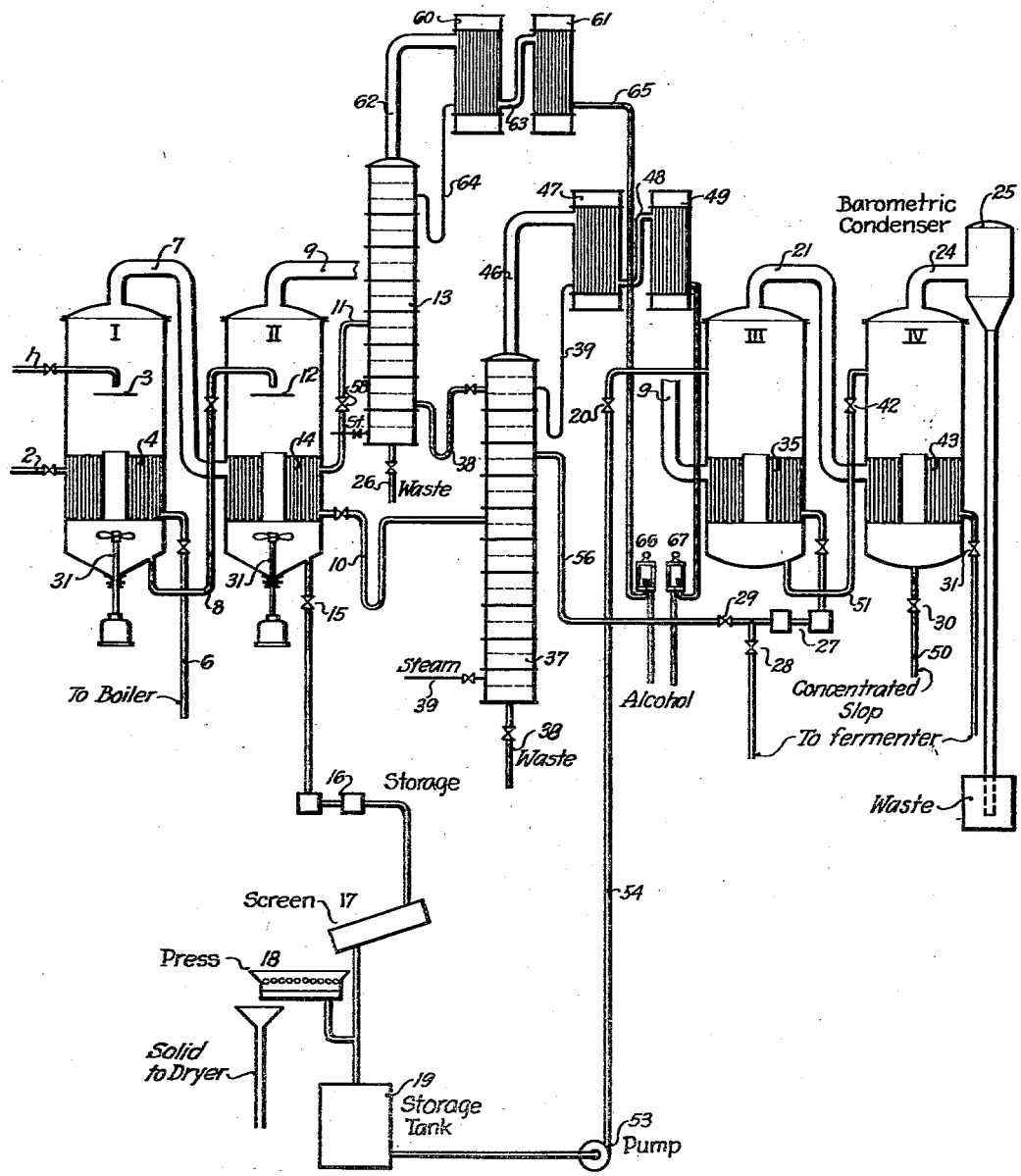

Aug. 16, 1938. G. T. REICH 2,127,138
PROCESS FOR SIMULTANEOUSLY EVAPORATING AND DISTILLING LIQUIDS
Filed April 25, 1934 2 Sheets-Sheet 2
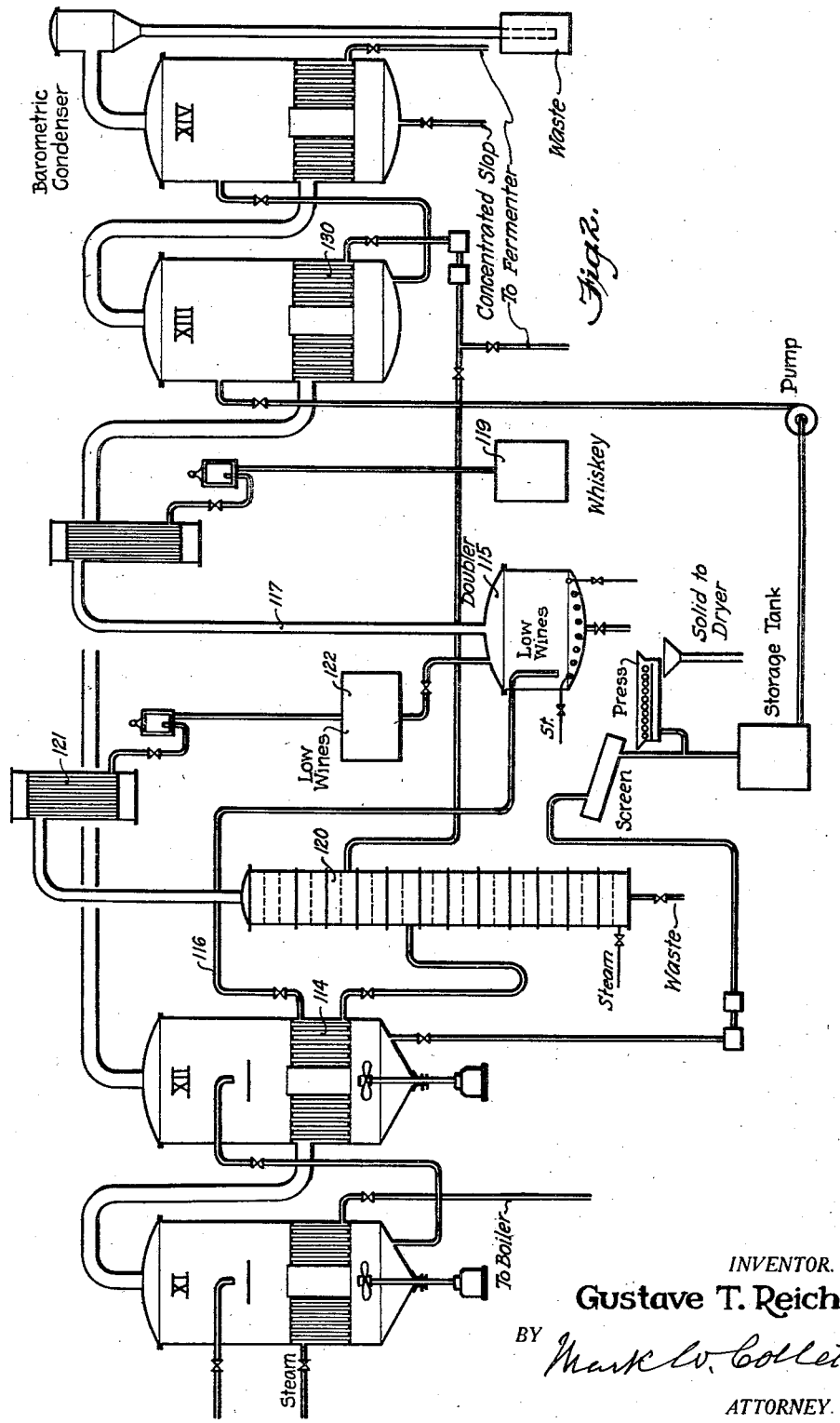
INVENTOR.
Gustave T. Reich
BY
ATTORNEY.

Patented Aug. 16, 1938

2,127,138

UNITED STATES PATENT OFFICE 2,127,138

PROCESS FOR SIMULTANEOUSLY EVAPORATING AND DISTILLING LIQUIDS

Gustave T. Reich, Philadelphia, Pa.

Application April 25, 1934, Serial No. 722,295

8 Claims. (Cl. 202—45)

My invented process comprises a step wherein the vapors that heat a subsequent effect, in my preferred practice the second effect, of a multiple effect evaporator, are only partly condensed by their heat exchange with the liquid contents of this effect, and pass from the calandria or other heating device of the effect, partly as vapor and partly as condensate. The vapor contains the predominant part of the more volatile components, the alcohol and similar materials. The condensate contains predominantly the aqueous material which boils at a higher temperature. The two may be drawn off separately and treated separately.

Viewed in another aspect, the quantity of the vapor that is passed into the calandria of the subsequent effect is enough greater than is necessary to produce the heating of the liquid in this effect for the production of the vaporization desired in it so that only a partial condensation of the vapors in the calandria will take place, condensing mainly only their less volatile components.

The calandria in the second effect acts as a dephlegmator. The condensate, however, preferably is carried to a stripping still outside the series of multiple effects of the evaporator. It is not returned to the first effect. As shown in the drawings, the vapor is conducted to a rectifying still or to a doubler, which is a surrogate for a dephlegmator. In either of these instrumentalities, the proof of the vapors is raised further. Other instrumentalities may receive the vapor from the calandria of the second effect. In a dephlegmator, as is well known, at any particular moment the vapor and condensate therein are under equal pressure and are under the same pressure as that in the vessel where the original vaporization of the vapor that is dephlegmated, is conducted. The vapor remains under the same pressure in the vessel where it is generated and in the dephlegmator. If this pressure were released prior to the removal of the vapor, this vapor would be diluted by vapors that would be evaporated from materials in the condensate having a higher boiling point than the materials that had stayed uncondensed. These diluting vapors would flash up on the release of pressure. Accordingly, means must be provided by which the pressure is maintained in the calandria, and a separation of the vapors and condensate must be maintained, until the vapors and condensate have been drawn off separately. A valve control for each of the conductors that lead off from the calandria is used, in practice, in my device, and a convenient form of this provision will be described hereafter in the detailed description of a form of mechanism serviceable to carry out the process.

As is well known, when evaporation and distillation are carried out on the principle of a multiple effect evaporation, the vapor pressure in one effect will be identical with the vapor pressure in the calandria of the succeeding effect. The vapor pressure, however, is less in each succeeding pairs, consisting of a body of an effect and a calandria of the following effect. For instance, the vapor pressure in the first effects and in the calandria of the second effect may be 5#, and in the second effect and calandria of the third effect may be 14" vacuum, in the third effect may be 29" vacuum, which pressures I find are workable successfully in carrying out my process. This fact enables the vapors in the calandria of the second effect to evaporate a material from the liquid in the body of the second effect, by heat interchange, although the temperature of the liquid in the second effect is less than the temperature of the vapors in the calandria in which this same material condenses, because the contents of the body of the second effect are under less pressure than the vapors in its calandria. From the physical principle that the boiling point of a liquid is higher as the atmospheric pressure becomes greater, follows also the necessity that the vapors from the calandria be drawn off separately from the condensate in it, and that the same pressure be maintained on the condensate while it and the uncondensed vapor are, at the same time, in the calandria, and until they are drawn off and completely isolated from each other, because, were they drawn off together, or if, before the vapors were drawn off, the pressure were reduced, or if the pressure were reduced, while the vapors and condensate in the calandria were in communication with each other, the dephlegmation would be nullified because, upon the release of pressure on the condensate, a flash evaporation of higher point boiling constituents would arise from the condensate. The vapors that had been raised to higher proof by dephlegmation would then become diluted by vapors of the very materials that had been condensed and deposited out of the dephlegmated vapors.

The process also secures the retention, in the alcoholic vapors, of the aldehydes and other bouquet giving materials that are of lower boiling points than alcohols. The dephlegmation of the vapors coming into the calandria in the second effect raises the proof of the alcohol in the uncondensed portion of these vapors. This vapor may be rectified directly. If the temperature and rate of flow of the beer be maintained constant, and other things are equal, the proof of the vapors from the calandria of the second effect is constant, also, the composition of the condensate will be constant.

Therefore, maintaining undiluted the mixture of alcohol, aldehydes and other bouquet giving materials, by the dephlegmatory action, caused therein through a partial condensation only of the vapor from the first effect, in the calandria of the second effect; obtaining the alcohol as a product of consistently high proof, and containing all the bouquet giving materials, direct from the calandria, may be considered as important features of my invention.

Besides this feature, the process may comprise also a number of other steps that are of value both in cooperation with this particular step and also may be used with other steps in distillation, among them may be mentioned the commingling of the vapors with the various effects in a very effective way: the facility with which the distillation can be accomplished because of the great lessening of the amount of evaporation required in several steps and a number of other steps which will appear as I describe the process as I practice it, as a whole and in the detailed special concrete instances, which I have added to the general description to serve as helpful examples to those who would practice my invented process.

These steps are also of very considerable economic value, in saving space, cost of plant, labor and quantities of fuel required.

In practicing my invention, as a whole, in the manner I have found the best in practice, I proceed as follows:—

I introduce beer or other fermented material containing organic volatile constituents into the first effect of a multiple effect evaporator, while this effect is at a pressure above that of the atmosphere, and is heated to a temperature sufficient to vaporize a very large proportion of the most volatile material as for instance ethyl alcohol present in beer. This vapor will be mixed with water vapor which should not exceed three to five times the amount of the alcohol vapor. These vapors are produced in large quantities by the use of some heating means, such as a steam heated calandria in the first effect. They are then passed through the heating devices of the second effect which contains beer that had been largely dealcoholized in the first effect, as above indicated, and is under a less pressure than obtained in the first effect, usually below atmospheric pressure. The heat exchange between the large quantity of vapor in the calandria of the second effect and the liquid contents of this effect which contains still a portion of the alcohol of the beer, say about 5%, is arranged so that the heating of this effect (it being at a lower pressure than the first effect) will cause the evaporation of the remaining 5% of alcohol or nearly all of it, leaving the liquid content of this second effect practically dealcoholized, in fact, merely a slop.

The amount of water vapor that is evaporated together with the 5% or so of alcohol is not very important. The amount of vapor fed to this calandria or other heating device from the first effect will be sufficiently great in quantity to produce in the calandria or other heating unit of the second effect, only a partial condensation that consists mainly of materials having higher boiling points, without causing in the calandria the condensation to any great extent, of the elements having a lower boiling point, so that the condensate will consist mainly of the materials having the higher boiling point and the vapors from this heating element will consist mainly of vapors having the lower boiling point. The materials having the lower boiling point will be mainly alcohols. The liquids having the higher boiling point will be aqueous. However, prior even to the evaporation of alcohols, the aromatic compounds will pass off as vapor and these aromatic compounds will be practically completely evaporated in the first effect and will be retained almost completely in the vapors and are not condensed in the calandria of the second effect. As these vapors of the aromatic compounds are even more thoroughly vaporized in the first effect that the alcoholic vapors are and hence the alcoholic vapors that pass into the calandria of the second effect and the uncondensed portions of this vapor that pass off, as still vapor, from the calandria of the second effect will contain a still larger proportion of the vapors of these compounds, a much greater proportion than would be contained, ordinarily, in liquor subjected to ordinary distillation methods. The "bouquet" and the odor, and the pleasant taste of whiskey and other beverage alcohols is due largely to the kind of such oils it contains and their quantity. The former are carried to the still directly and will be, even when entering the still, high in alcoholic content, and the liquid condensate passing out from the calandria of the second effect will be carried off for further evaporation, distillation or to the fermenters. The treatment of the vapors given off from the calandria of the second effect may vary. Different steps may follow the step previously described according to the requirement of the plant and the products that are desired to be produced.

Fig. 1 is a diagrammatic view of a plant where a still and a stripping still are used. Fig. 2 is a diagrammatic view of a still especially adapted to produce whiskey in which a "doubler" is employed.

Describing now my process in general with reference to Fig. 1, which is an illustration of a particular form of suitable plant for use in my process:—

I is a first effect into which beer is introduced by a conductor 1, that is suitably valve controlled. A plate 3 which serves to spread or disperse the beer so that it falls onto a calandria, 4, that is heated by steam introduced through the steam pipe, 2, also suitably valve controlled. The conductor, 6, carries off the condensed water. This effect, I, produces vapors of at least two components that pass from it to the calandria, 14, of the second effect, II. Merely, for the purpose of illustration, the first effect may be at a temperature of 220° F. and under, say 5 lbs. pressure. If this effect is kept at about this temperature and pressure, 100,000 gallons of beer containing 3% alcohol by volume should vaporize and yield as vapor, 36,000 gallons, say about 43° proof, leaving in the residue 64,000 gallons of largely dealcoholized liquor containing approximately 5% of the alcohol orginially present in the beer. As a vacuum of about 8" to 14" may be maintained in the second effect, the combined action of this vacuum and the pressure in the first effect would, in such case, bring the liquor, which would still contain suspended material, from the first effect into the second. The flow of steam in the calandria, 4, and of beer directly into the effect, I, are so relatively adjusted that they will supply enough vapor to the calandria, 14, by the heat exchange to vaporize the liquor sufficiently in effect, II, without condensing the portion of the vapors in the calandria, 14, that consists mainly of the components of this vapor having the lower boiling points, while allowing the components of this vapor of higher boiling points to condense. The liquid condensate should be in equilibrium with the remaining liquor from which it is separated and with the amount of liquor to be evaporated in the second effect. This partial condensation will produce a condensate poorer in volatile components than the vapors which are not condensed and therefore the vapors are enriched in volatile components, and pass off uncondensed from the heating element.

This can be determined by adjusting both positively and relatively to each other the passage of beer and steam through the pipes 1 and 2, and the vacuum maintained in effect II. No precise rules can be given, but a larger quantity of both beer and steam is needed than when all the vapor in the heating unit is condensed, and when all this vapor passes off from the calandria, 14, as condensate. The result is that I am capable of effecting the separation of two volatile liquids as satisfactorily and much more economically than by more complicated distillation processes. The result is also that by partial cooling of the mixed vapors in the heating element by heat exchange with the liquor in effect II to a definite temperature, a condensation product may be obtained containing about 3–10 proof alcohol proof and alcoholic vapors of about 100–120 proof may pass from the calandria, 14, by valve, 58, for further increase of the proof either into a rectifying still of a standard design or into the customary still called "doubler" practiced in the art of manufacturing whiskey. The condensate formed in the calandria, 14, is also in equilibrium with the liquid evaporated in effect, II. This condensate may be returned to the evaporator, to still 37, or if very low in its alcohol content, to the fermenters. The vapors and condensate leaving the calandria, 14, may be approximately 36,000 gallons which evaporated from effect I. Thus the separation of almost all of the alcohol from the vapors produced in effect I is immediately obtained in the calandria, 14.

The dealcoholized beer called "slop" may be freed from its suspended solids by means of screening and pressing. The solids may be dried in suitable dryers, while the liquid is further evaporated for the recovery of the solids in solution. This procedure is a standard practice in the distilling industry for the production of feed stuffs.

I will describe in detail with reference to Figs. 1 and 2, two of the numerous forms of plants which may be used in carrying out my process together with the details of practicable methods of using the same. These detail descriptions are intended merely to enable those skilled in the art or in the manufacture of alcohol to build and operate such a plant and to serve as concrete examples of ways of carrying out my process above described. They are not to be considered as limiting my invention.

*The plant illustrated in Fig. 1 and a method that may be practiced in such a plant*

A multiple effect evaporator is used comprising the effect I, heated by the steam introduced into the calandria, 4, by the pipe, 2, the condensate from which may be drawn off by the pipe, 6, and may be returned to the boiler, and three other effects, II, III, and IV, each heated by the vapors from the prior effect, and each under progressively lower atmospheric pressure. The beer or other fermented product to be evaporated and distilled enters by the pipe, I, and may be distributed by a distributor, 3, in practice, a disc, 3, over the calandria 4. The liquid in effect I may be agitated by the agitator 31. The vapors from the liquid in this effect pass through a pipe, 7, to the calandria, 14, of the second effect, II. This vapor may contain at least 95% of the alcohol and will usually be composed of about 3 parts water and one part alcoholic vapors.

This vapor is produced in the effect I in sufficient quantity to evaporate the desired amount of the liquid in the effect, II, without the necessary exchange of heat at the calandria, 14, reducing to condensate more than the portion of the vapors composed of materials having a low boiling point leaving the remainder of them vaporized. These vapors leave the effect, II, through a lead off conductor, 11, provided with a valve, 58, to a still, 13, into which they are introduced "part way up". In this still the rectification of the vapors to higher proof is accomplished; the vapors passing off through a conductor, 62, to a dephlegmator, 60, from which a condensate poorer in alcohol is returned by a conductor, 64, and vapors of high proof pass by a pipe, 65, to an alcohol storage tank 66. This proof may often be as high as 190°. The portion of condensate in the still, 13, passes to a stripping still, 37, by a conductor, 38, and usually a portion of totally dealcoholized material is drawn off by the conductor, 26. The condensate from the calandria, 14, may be passed into the stripping still. It is shown as carried by the conductor, 10. Other condensate may be drawn into the stripping still, 37, as may be described in a later portion of the specification.

The concentration of the slop may be accomplished in many ways. I have shown it being accomplished by carrying off the dealcoholized slop from the effect, II, by a pipe, 15, (in which a storage means, 16, may be interposed) to a screen, 17, and a press, 18, from which the thin slop flows to a storage tank, 19, and the matter in suspension passes to a drier. From the storage tank the thin slop may be driven for example by a pump, 53, through the conductor, 54, to the effect III.

The effect, III, is heated by the vapors from effect, II, which pass to it through pipe 9 to the calandria, 35, the condensate from which may be passed through the pipe, 56, to the striping still, 37, which in the particular embodiment of my invention shown in this example of my device is fed from three sources; the portion of the vapors that had condensed in calandria, 14, forming the condensate from the calandria of effect II, the condensate from the still, 13, and the condensate (the whole of the vapors from effect II), from the calandria, 35. This last condensate may, however, be diverted and fed into the fermenter. This diversion may be effected by valves 28 and 29 and pipe 25. The vapors from the stripping still, 37, may pass through a pipe, 46, to a dephlegmator, 47, that has the lower proof return pipe, 39, leading from the dephlegmator, 47, back to the stripping still 37. The vapor line, 48, leads from the dephlegmator 47 to the condenser 49, the condensate from which passes to the alcohol storage tank, 67, which may likely be of lower proof than that collected in the storage tank 66. The barometric condenser, 45, maintains the vacuum in the effects II, III and IV.

In the example illustrated in Fig. 2, the construction is illustrated as being substantially like the device and method, up to the still, as in the device illustrated in Fig. 1 and described immediately above. The beer enters the effect XI by the pipe, 101; the steam in calandria 104 by the pipe 102. The vapors generated in the effect XI are generated in sufficient excess to vaporize by heat exchange sufficiently the liquor in the effect XII to produce the equilibrium necessary between the condensate in the calandria, 114, in the effect XII and the vapor evaporated from it, and in other ways the structure and operation of these two effects are substantially like the corresponding structures and operation of the effects I and II on the plant illustrated in Fig. 1.

In the device illustrated in Fig. 2 the vapor from the calandria, 114, is led into a doubler, 115, into which are low wines, from which the vapors that had come from the calandria, 114, through the pipe, 116, are led, and are fortified by passage through the heated low wines and pass off through the pipe 117 to the condenser 118, from which they pass into the whiskey storage 119. The condensate from the calandria, 114, to a still, 120, and condense the vapor from it in a condenser indicated at 121, whence it passes to the doubler, 115. A storage tank indicated by 122 may be interposed between the condenser and the doubler. The vacuum in effects XII, XIII, XIV, may be maintained by a barometric condenser, 150.

My invention, however, is not limited in any way to the particular devices or process steps defined in the two examples of the way in which my process may be utilized. The essential novelty of my process is defined in the earlier portion of the specification and has to do with the cooperating steps described as occurring in the first two effects. After these steps the vapors and condensates may be variously disposed of. I have shown and described elements of novelty of substantial value in the later part of my specification and have claimed them below. I do therefore neither disclaim these particular elements of novelty nor limit the essential steps of my process by them. The examples are described so that those skilled in the art could construct the plant and a distilling operative operate it, and are not an attempt to show extent of limitations of the invention. I claim the full extent of my claims.

I claim:—

1. In a continuous process for distilling fermented liquors to produce a high proof alcohol in a multiple effect evaporator, wherein the first effect is maintained at above atmospheric pressure, and the second effect is maintained at a partial vacuum, and the heating of the second effect being by means of a calandria, the steps of distilling off vapors from the fermented liquor of the first effect more than sufficient to vaporize the residual alcoholic liquor from the first effect in the second effect, thereby producing an almost fully dealcoholized condensate in the said calandria, which is led off for further processing, if desired, and also maintaining uncondensed in said calandria an alcohol of high proof in vapor phase, drawing off and collecting the alcohol of high proof directly from the calandria separately from the dealcoholized condensate, while maintaining the pressure of the first effect on said dealcoholized condensate.

2. In a continuous process for distilling fermented liquors containing volatile compounds, to produce a high proof alcohol containing these volatile compounds, said process being performed in a multiple effect evaporator, wherein the first effect is maintained at above atmospheric pressure and the second effect is maintained at a partial vacuum, and the heating of the second effect being by means of a calandria; the steps of distilling off vapors from the fermented liquor of the first effect alcohol contained in said fermented liquor, withdrawing the nearly de-alcoholized liquor from the first effect and passing it into the second effect, the vapors distilled from the first effect being led into the calandria of the second effect and exceeding the quantity required to vaporize the residual alcohol in the nearly de-alcoholized liquor withdrawn from the first effect into the second effect, thereby producing an almost de-alcoholized condensate in said calandria which may be led off for further processing if desired, and also maintaining uncondensed in the calandria of the second effect an alcohol of high proof and said volatilized volatile materials, and then drawing off from said calandria and collecting the alcohol of high proof with said volatilized material separately from said de-alcoholized condensate therein, while maintaining the pressure of the first effect on said de-alcoholized condensate.

3. In a continuous process for distilling fermented liquors to produce a high proof alcohol, in a multiple effect evaporator, wherein the first effect is maintained at above atmospheric pressure and the second effect is maintained at a partial vacuum, the heating of the second effect being by means of a calandria, the steps of distilling off vapors from the fermented liquor in the first effect, in a quantity more than sufficient to vaporize the residual alcoholic liquor withdrawn from the first effect and passed into the second effect, thereby producing an almost de-alcoholized condensate in the said calandria, which is led off separately while under pressure substantially that of the first effect for further processing if desired and also maintaining uncondensed in said calandria an alcohol of high proof in vapor phase, and while maintaining in said calandria the pressure of the first effect, leading off said alcohol in vapor phase apart from the condensate and directly from the calandria.

4. The process as defined in claim 1 wherein the vapors from the first effect carried over to the calandria of the second effect are over 30 proof.

5. The process as defined in claim 1 wherein the condensate from the vapors from the fermented material and partially condensed in the calandria of the second effect contain the greater portion of the alcohol contained in the fermented material.

6. In a continuous process for distilling fermented liquors to produce a high proof alcohol in a multiple effect evaporator, wherein the first effect is maintained at above atmospheric pressure and the second effect is maintained at a partial vacuum and the heating of the second effect being by means of a calandria, the steps of distilling off from the fermented liquor vapors containing at least almost all of the alcohol contained in the fermented liquid, in a quantity more than sufficient to vaporize the residual alcoholic liquor from the first effect in the second effect, thereby producing an almost fully de-alcoholized condensate in the said calandria, which is led off for further processing if desired and also maintaining uncondensed in said calandria an alcohol of high proof, in vapor phase, drawing off and collecting the alcohol of high proof directly from the calandria separately from the dealcoholized condensate, while maintaining the pressure of the first effect on the de-alcoholized condensate.

7. In a continuous process for distilling fermented liquors containing volatile compounds to produce a high proof alcohol, containing these volatile compounds, in a multiple effect evaporator, wherein the first effect is maintained at above atmospheric pressure, and the second effect at a partial vacuum, and the heating of the second effect being by means of a calandria, the steps of distilling off the vapors from the fermented liquor vapors, said vapors containing all the volatile materials and nearly all of the alcohol contained in the fermented liquor, in a quantity more than sufficient to vaporize the second effect, the residual alcoholic liquor from the first effect thereby producing an almost fully dealcoholized condensate in said calandria, which condensate is led off for further processing, if desired, also maintaining uncondensed in said calandria said materials mingled with an alcohol of high proof, all in vapor phase, drawing off and collecting the mingled vaporized materials and high proof alcohols separately from the de-alcoholized condensate while maintaining the pressure of the first effect on said condensate.

8. The process defined in claim 7 wherein substantially all of the volatilized compounds and almost all of the alcohol contained in the fermented liquor is distilled in the first effect from the fermented liquor therein.

GUSTAVE T. REICH.